United States Patent

[11] 3,586,845

[72] Inventors Yasuo Komamiya
Yokohama;
Kazuo Kurokawa, Tokorozawa-shi; Tatsuo Goto, Tokyo; Ryoichi Mori, Tokyo; Hiraoki Tajima, Tokyo, all of, Japan
[21] Appl. No. 665,809
[22] Filed Sept. 6, 1967
[45] Patented June 22, 1971
[73] Assignee Agency of Industrial Science and Technology
Chiyoda-ku, Tokyo, Japan
[32] Priority Sept. 13, 1966
[33] Japan
[31] 41/60,149

[54] BINARY FULL ADDER UTILIZING OPERATIONAL AMPLIFIERS
7 Claims, 14 Drawing Figs.

[52] U.S. Cl. .......... 235/172,
235/168, 235/175
[51] Int. Cl. .......... G06f 7/385
[50] Field of Search .......... 235/168,
156, 172, 175; 307/216

[56] References Cited
UNITED STATES PATENTS

| | | | |
|---|---|---|---|
| 3,113,206 | 12/1964 | Harel .......... | 235/172 X |
| 3,171,022 | 2/1965 | Schmid .......... | 235/156 X |
| 3,183,342 | 5/1965 | Wortzman .......... | 235/156 |

*Primary Examiner*—Malcolm A. Morrison
*Assistant Examiner*—James F. Gottman
*Attorney*—Kurt Kelman

ABSTRACT: This invention relates to a digital logic circuit which incorporates an analogue operational amplifier as a component of the circuit.

INVENTORS.
YASUO KOMAMIYA
KAZUO KUROKAWA
TATSUO GOTO
RYOICHI MORI
HIROAKI TAJIMA
BY
Kurt Kelman
AGENT INVENTORS.
YASUO KOMAMIYA
KAZUO KUROKAWA
TATSUO GOTO
RYOICHI MORI
HIROAKI TAJIMA
BY
Kurt Kelman
AGENT INVENTORS.
YASUO KOMAMIYA
KAZUO KUROKAWA
TATSUO GOTO
RYOICHI MORI
HIROAKI TAJIMA
BY Kurt Kelman
AGENT

INVENTORS.
YASUO KOMAMIYA
KAZUO KUROKAWA
TATSUO GOTO
RYOICHI MORI
HIROAKI TAJIMA

BY Kurt Kelman
AGENT ( Down to n )

INVENTORS
YASUO KOMAMINA
KAZUO KUROKAWA
TATSUO GOTO
RYOICHI MORI
HIROAKI TAJIMA
BY
Kurt Kelman
AGENT

INVENTORS.
YASUO KOMAMIYA
KAZUO KUROKAWA
TATSUO GOTO
RYOICHI HORI
HIROAKI TAJIMA

BY Kurt Kelman
AGENT

BINARY FULL ADDER UTILIZING OPERATIONAL AMPLIFIERS

Conventional digital logic circuits have such fundamental logic circuits as OR circuit, AND circuit, NOT circuit, etc. as the main elements and are composed of combinations of these circuits. Owing to this fact, in complicated circuits, a vast number of fundamental logic circuits are used which not only require much labor for assembling and considerable cost for manufacture, but also involve problems checking utilization such as increase of failure rates, delay of operation time and increase of dissipation power. However, so far as combinations of fundamental logic circuits are employed, it is evident that the solution of such economical and technical defects is extremely difficult. But, the conventional combination technique is still used and any new method of composition to replace it has not appeared.

As is generally known, regarding the analogue operational amplifier, when it is used, for instance, as an analogue summing amplifier, it has the function to add or subtract many inputs after multiplying them respectively by *a*, *b*, *c*,..... times very easily and when it is used as an analogue summing comparator, it performs the above functions and besides, over a certain level, it is capable of generating predetermined output signals easily. Thus, it has the operation ability which develops suitable functions depending on the objects. However, if it is attempted to obtain the same functions by digital logic circuits, a very large number of fundamental logic circuits and complicated combinations are required. Therefore, if it is possible to replace part of the digital logic circuits with analogue operational amplifiers, the circuit construction will surely be simplified by this replacement.

An object of the present invention is to provide digital logic circuits of simple circuit construction by incorporating analogue operational amplifiers into the circuits.

Other objects and characteristic features of this invention will become apparent from the complete description and examples as will be given hereunder, particularly if read in conjunction with the accompanying drawing, wherein:

FIG. 2 shows a binary full adder circuit utilizing operational amplifiers.

FIG. 3 shows binary full adder circuit utilizing operational amplifiers capable of adding two bits at a time.

FIG. 4 shows binary full adder circuit utilizing operational amplifiers for $n+1$ bits.

FIG. 5A shows a binary parallel adder circuit utilizing operational amplifiers.

FIG. 5B shows a binary parallel adder circuit utilizing operational amplifiers for $n+1$ bits.

FIG. 6 shows binary full adder circuit utilizing operational amplifiers for $n+1$ bits.

FIGS. 7 and 8 show binary full adder circuits utilizing operational amplifiers for $n+1$ bits using the circuit in FIG. 6.

FIG. 9 shows an AND circuit.

FIG. 10 shows an OR circuit.

FIG. 11 shows a NOT circuit.

FIG. 12 shows a NAND circuit.

FIG. 13 shows a 2-input EXCLUSIVE-OR circuit.

Figure 1:
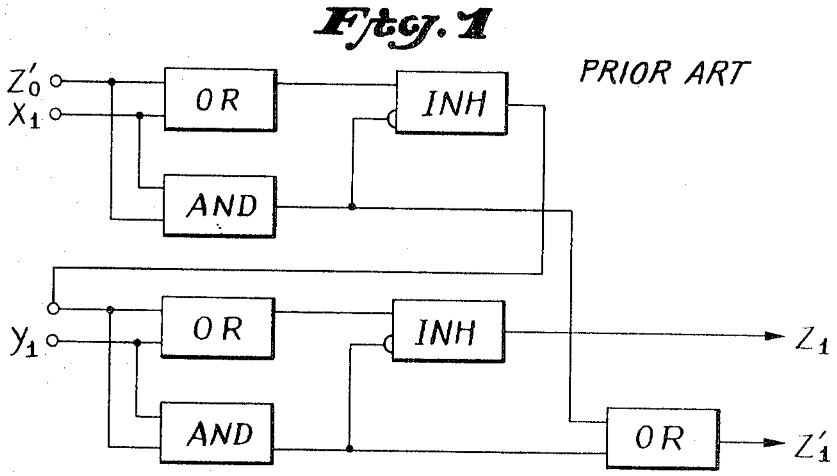
FIG. 1 shows a conventional full adder circuit.

Referring to the drawing, FIG. 1 shows a full adder circuit consisting of combinations of the conventional fundamental logic circuit. As shown in FIG. 1, it is composed of three OR circuits, two AND circuits and two INH (inhibit) gate circuits. $x_1$ and $y_1$ are numbers to be added, $z'_o$ is a figure carried from the preceding digit, $z'_o$ is a figure to be carried to the next digit and $z_1$ is the answer. Each of them takes the value of "0" or "1."

Figure 2:
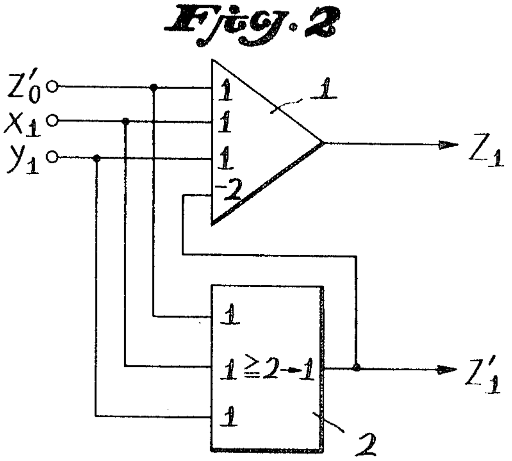
FIGS. 2 through 13 show embodiments of the present invention.

Whereas, a circuit based on this invention as a very simple construction as shown in FIG. 2, employing analogue summing amplifier 1 and analogue summing comparator 2 which are applications of the analogue operational amplifier. In FIG. 2, the entry of 1 at the position of the input to the analogue summing amplifier 1 indicates that addition should be performed after multiplying by 1 and that of −2 shows that addition should be conducted after multiplying by −2. The analogue summing comparator 2 shows that an output of "1" is generated when the results of addition after multiplication by the factors marked at the position of input are 2. In this circuit, when any one of the inputs, $x_1$, $y_1$ and $z'_o$, is "1" and the other two are "0," the output $z'_1$ of the analogue summing comparator 2 becomes "0" and the output $z_1$ of the analogue summing amplifier 1 becomes "0." On the other hand, when two of the inputs are "1" and the remaining one is "0," the output $z'_1$ of the analogue summing comparator is "1" and the analogue summing amplifier 1 performs the operation of $2-2=0$ with the resultant output $z_1$ of "0." When all the inputs are 1 respectively, the output $z'_1$ of the analogue summing comparator 2 is "1" and the analogue summing amplifier 1 performs the operation of $3-2=1$ with the resultant output $z_1$ of "1." The above results of operation conform with those of the full adder circuit of a digital circuit.

When FIG. 1 and FIG. 2 are compared, the conventional circuit in FIG. 1 requires seven fundamental circuits, but the circuit of this invention shown in FIG. 2 is composed of only two fundamental circuits. Besides, in the circuit of FIG. 1, the results are obtained after coming through five steps, but in FIG. 2 only two steps are required and accordingly the time for operation becomes very much shorter than the former. Therefore, even if the operation speed of the analogue operational amplifier of this invention is slower than that of the digital fundamental circuit, the former has a sufficient possibility to operate at higher speeds as a whole in complicated circuits such as adder circuits of $n$ bits.

Figure 3:
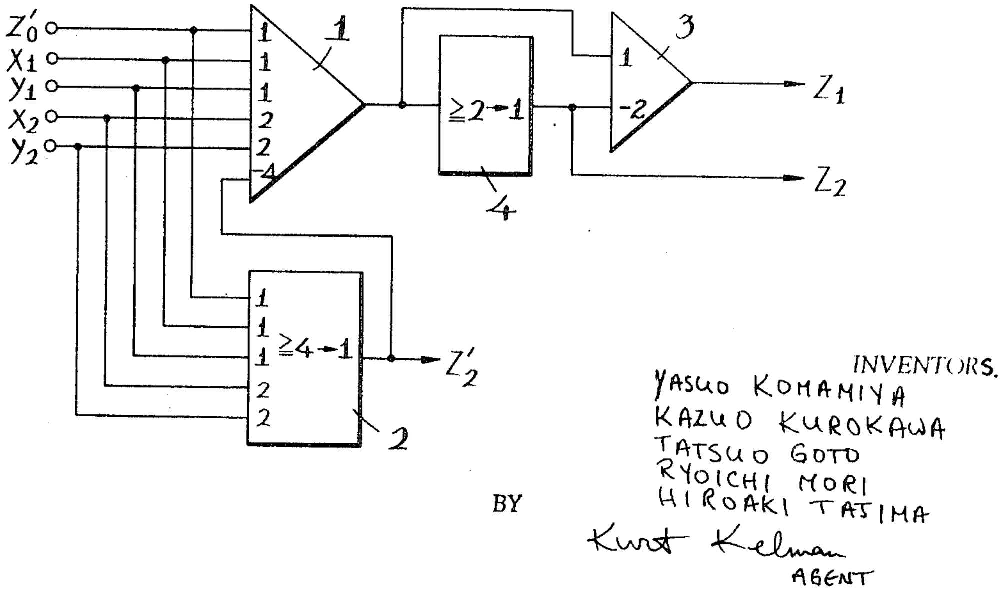

Next, FIG. 3 shows an application example of an adder circuit which is capable of adding two bits at a time.

If numbers of two bits to be added, X and Y, are expressed in the form of a sum of powers of 2, the following formulas are obtained.

$X=x_2 2^1+x_1 2^0$ $Y=y_2 2^1+y_1 2^0$

Here, $x_2$, $y_2$, $x_1$ and $y_1$ are "0" or "1" respectively. Accordingly, the multiplication factors of the analogue summing amplifier 1 and analogue summing comparator 2 are 1 for $z'_o$, $x_1$ and $y_1$ and 2 for $x_2$ and $y_2$. The multiplication factor of the input to $z'_2$ of the analogue summing amplifier 1 is −4 as it is necessary to multiply $z'_2$ by $-2^2$ in order to make the analogue summing amplifier 1 perform the operation of $$2(x_2+y_2)+x_1+y_1+z_0'-z_2'2^2=z_2 2+z_1.$$

Next, in order to separate $z_2$ and $z_1$ from $z_2 2+z_1$, analogue summing comparator 4 and analogue summing amplifier 3 are installed. From the fact that when numbers larger than $2^1$ are contained in the output $z_2 2+z_1$ of the analogue summing amplifier 1, $z_2$ is "1," $z_2$ can be detected by the analogue summing comparator. As the remainder obtained by subtracted $z_2 2$ from the output of the analogue summing amplifier 1 is $z_1$, $z_1$ can be obtained from the result of operation of $(z_2 2+_1)-z_2 2$ by the analogue summing amplifier 3.

Figure 4:
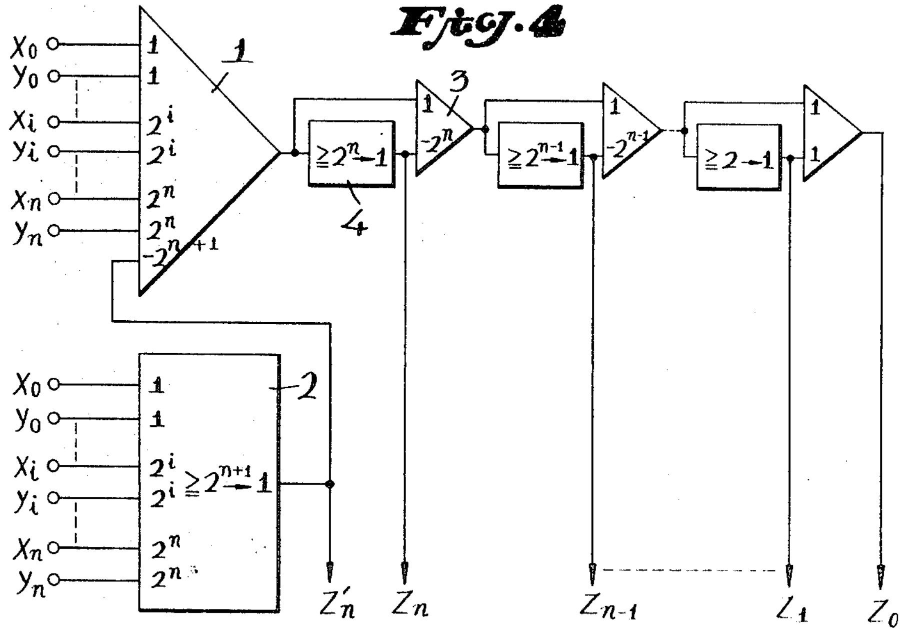

Next, an application example of an adder circuit of $n+1$ bits in general is shown in FIG. 4. In general, binary numbers of $n+1$ bits, X and Y, are expressed in the form of a sum of powers of 2 as follows.

$$X=x_n 2^n v_{n11}{}^{n11}+\ldots\ldots x_i 2^i+\ldots\ldots x_1 2^1+x_0 2^0 \ldots (1)$$

$$Y=Y_n 2^n ⅔_{n11}{}^{n11}+\ldots\ldots y_i 2^i+\ldots\ldots y_1 2^1+y_0 2^0 \ldots (2)$$

The terms of $X+y$ may be put as shown below:

As to the coefficient of $$2^0 \text{ term: } x_0+y_0=z_0'2^1+z_0 \quad (3)$$

do do do do $$2^1 \text{ term: } x_1+y_1+z_0'=z_1'2^1+z_1 \quad (4)$$

. .

. .

. .

do do do do $2^1$ term: $x_i+y_i+z'_{i-1}=z_i'2^1+z_i$ (5)

. .

. .

. .

do do do do $2^{n-1}$ term: $x_{n-1}+y_{n-1}+z'_{n-2}=z'_{n-1}2^1+z_{n-1}$ (6)

do do do $2^n$ term: $x_n+y_n+z'_{n-1}=z'_n2^1+z_n$ (7)

Multiply both sides of the equations (3) through (7) by the above $2^0$, $2^1$, ... $2^i$, ... $2^n{}_1{}^1$ and $2^n$ respectively and add them; then the following will be obtained.

$$X+Y=(x_n+y_n)2^n+(x_{n1}+y\mathbf{n}_{11})2^{n11}+\ldots(x_i+y_i)2^i$$
$$+\ldots..(x_1+y_1)2^1+(x_0+y_0)2^0$$
$$=z'^{2n+1}+z_n2^n+z_{n11}{}^{n11}+\ldots..z_i2^i+\ldots.$$
$$\ldots\ldots\ldots. z_12^1+z_02^0 \ldots\ldots\ldots\ldots\ldots\ldots\ldots\ldots (8)$$

The right-hand side of the equation (8) means that if $X+Y$ contains the terms of $2^{n+1}$, $z'n$ becomes 1.

Accordingly, in the adder circuit of $n+1$ bits in FIG. 4, $z'_{n\,n}$ is detected by the analogue summing comparator 2 depending on whether $X+Y\geqq2^{n+1}$ or $X+Y<2^{n+1}$. In FIG. 4, the analogue summing amplifier 1 performs the following operation:

$$(x_n+y_n)2^n+(x_{n11}+y_{n11}2^{n11}+\ldots..(x_i+_i)2^i+\ldots$$
$$\ldots..(x_1+y_1)2^1+(x_0+y_0)2^0-z'_n{}^{n+1}$$

and the output will be $$z_n2^n+z_{n11}2n^11+\ldots.. z_i2^i+\ldots.. z_12^1+z_02^0$$

Therefore, if $z_n$, $z_{n11}$, ..... $z_i$,..... $z_1$and $z_0$ are separated from the above, the desired result will be obtained. The analogue summing comparator 4 generates an output signal on "1" when the input is $2^n$ and an output signal of "0" when the input is $2^n$. Accordingly, when the output of the analogue summing amplifier 1 is either larger than or equal to $2^n$, it shows that $z_n$ is contained in the output of the analogue summing amplifier 1 and the analogue summing comparator 4 generates a signal of "1". Next, $z_n$ is multiplied $2^n$ times by the analogue summing amplifier 3 and the product is subtracted from the output of the analogue summing amplifier 1, viz.. the following operation if performed:

$$(z_n2^n+z_{n11}2^{11}+\ldots.. z_i2^i+\ldots.. z_12+z_02^{\,0})-z_n2^n$$

Then, the output will be $$z_{n11}2^{n11\ldots..}z_i2^i+\ldots..z_12^01+z_02^0$$

Now, $z_n$ has been separated from the output signal of the analogue summing amplifier 1. This is to be repeated in the following and $z_{n11}$, .... $z_i$, .... $z_0$ are separated and indicated in due order; then the answers for $X+Y$, $z'_n$,$z_n$, $z_{n11}$, .....$z_i$, ....$z_1$ and $z_0$, can be obtained.

Figure 5:
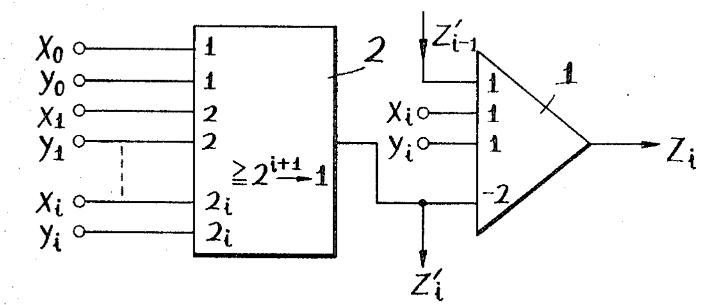

Next, FIG. 5 shows an application example of a parallel adder circuit of $n+1$ bits having a high-speed carry circuit. The answer $z_i$ for the "$i$"th bit will be obtained from the above equation (5) as follows:

$$z_i+x_i+y_i+z_{i11}{}^2z'_i$$

This can be obtained by the analogue summing amplifier 1 in FIG. 5A. $z'_i$ can be detected by the analogue summing comparator 2 as $z_i'=1$ when $(x_i+y_i)2^i+(x_{i-1}+y_{i-1})2^{i-1}+\ldots(x_1+y_1)2^1+(x_0+y_0)2^0\geqq2^{i+1}$ and $z_i'=0$ when the expression is less than $2^{i+1}$. FIG. 5B is an application of this case to $n$ bits. In this circuit, the carry $z'_i$ relates only to the next bit $z_i{}^+{}_1$ and does not affect bits after it; therefore, answers can be obtained by the two steps of the analogue summing comparator and analogue summing amplifier. Accordingly, irrespective of the number of bits, the summing results can be obtained at high speeds.

Figure 6:
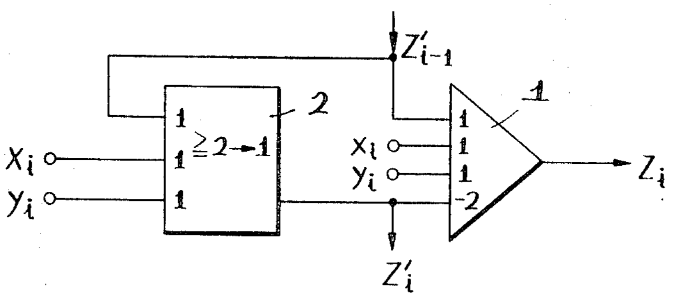
Figure 3:
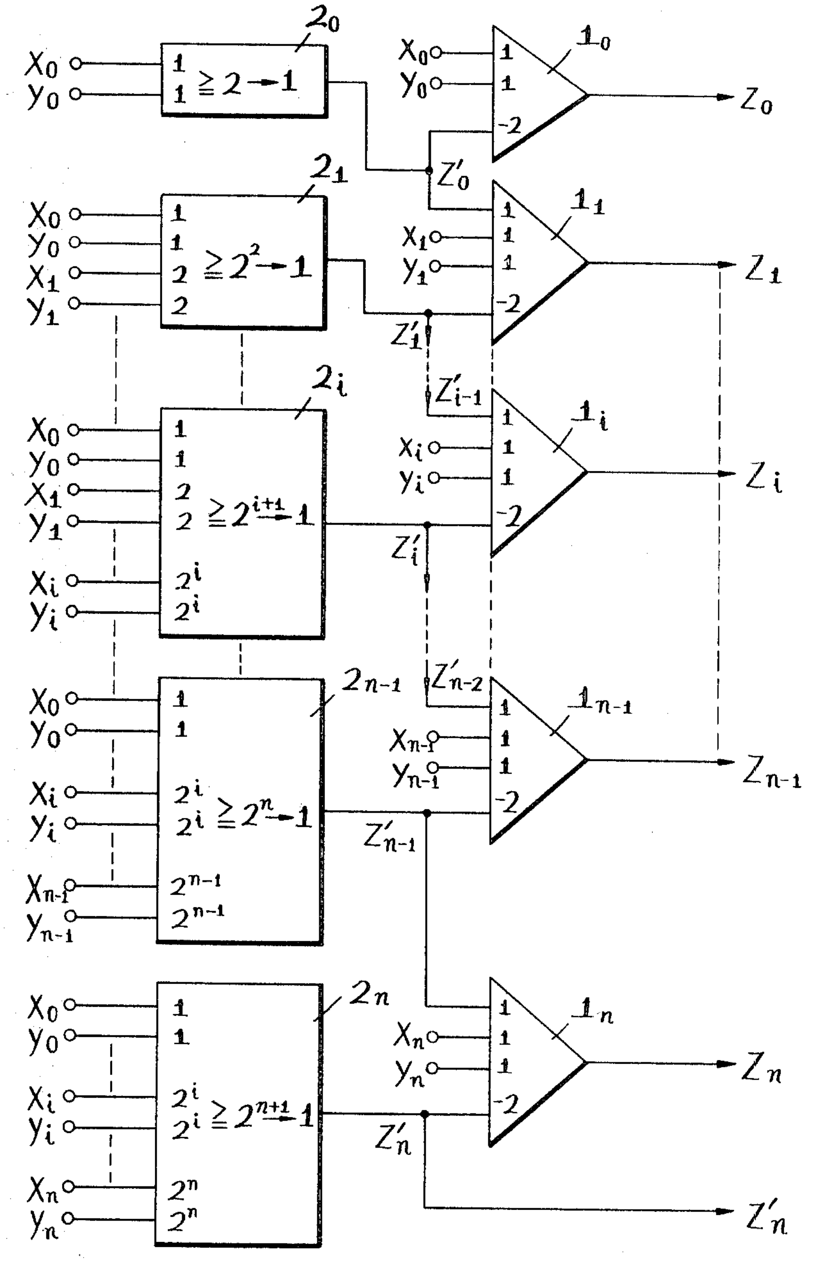
Figure 7:
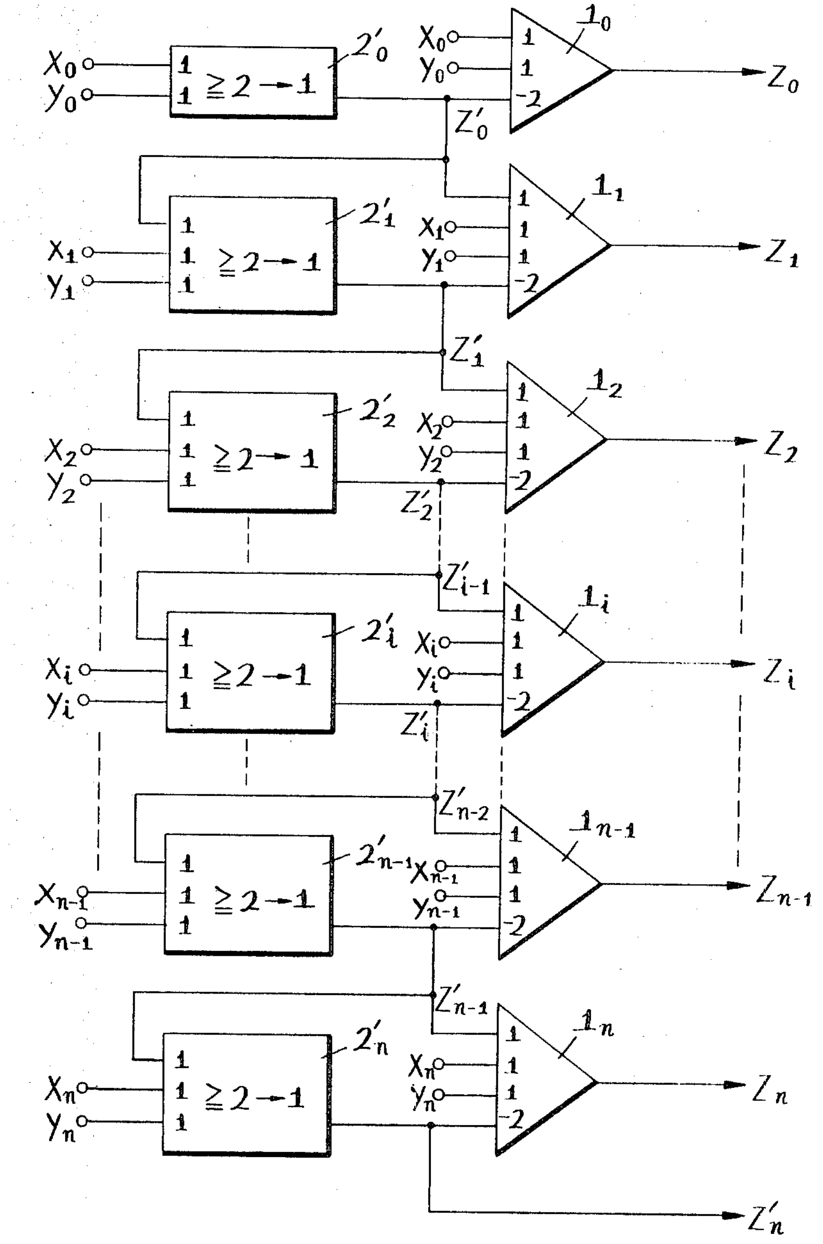

Next, FIG. 6 shows an application example of an adder circuit of $n+1$ bits which has a carry circuit different from the above two examples. From the above equation (5), we shall obtain $$z_i=x_i+y_i+z'_{i11}-2z'_i$$

and $z'_i$ becomes "1" when $x_i+y_i+z'_{i-1}\geqq2$ and "0" when the expression is less than 2. As a result, a circuit such as shown in FIG. 6 is obtained. When an adder circuit of $n+1$ bits is composed employing the circuit in FIG. 6, the circuit shown in FIG. 7 can be obtained. This circuit is an example where an analogue circuit exists in the digital information processing system.

Figure 8:
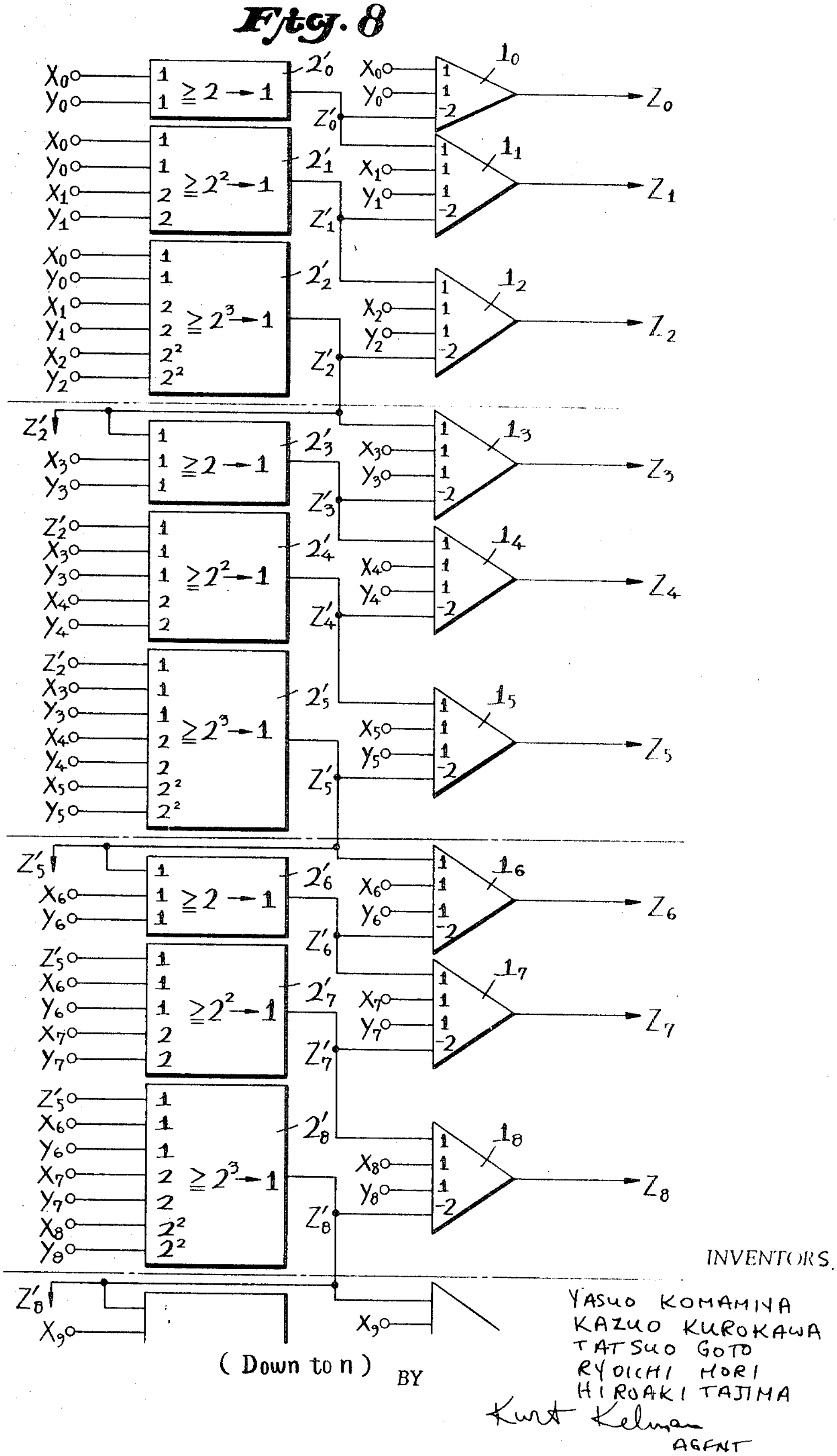

In the circuit of FIG. 5B, if inconvenience is felt in the handling of the fan-in of the analogue summing comparator as the number of bits increase and $n$ becomes large, the circuit in FIG. 5B should be divided with the circuit in FIG. 6 inserted every "$j$" bits as shown in FIG. 8 and then the fan-in of the analogue summing comparator does not exceed $2j+1$; therefore, there is no trouble experienced even when n becomes large.

Figure 9:
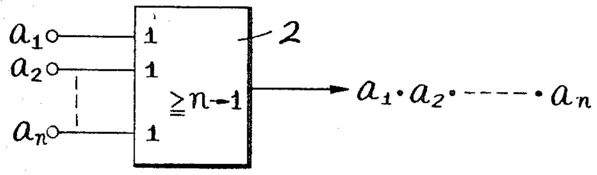
Figure 10:
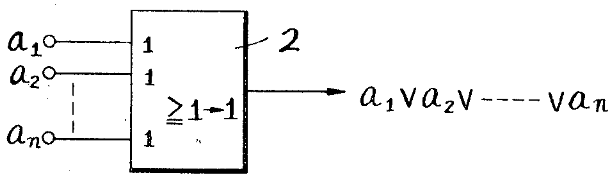
Figure 11:
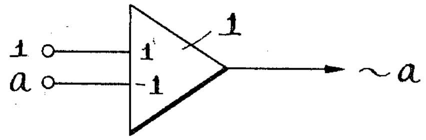
Figure 12:
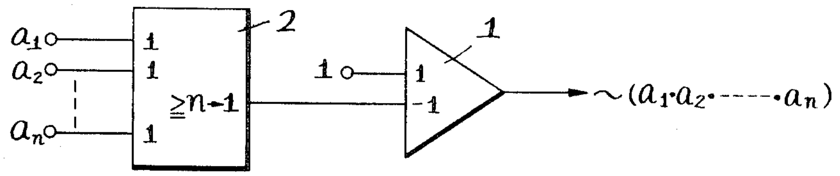
Figure 13:
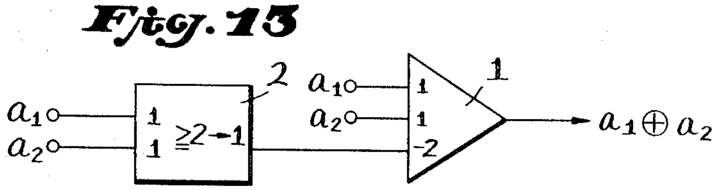

In the above, various application examples of adder circuits have been described. As other examples of application, FIG. 9 shows an AND circuit, FIG. 10 an OR circuit, FIG. 11 a NOT circuit, FIG. 12 a NAND circuit and FIG. 13 an EXCLUSIVE-OR circuit of 2-input. In these circuits, input is shown on the left end and output on the right end and input and output take the value of either "0" or "1" respectively. As the performance can be easily understood from the various examples of the adder circuits, explanations will be omitted.

As described above, the object of this invention is to compose a logic circuit which has the input of digital information of $n$ bits and the output of digital information of $m$ bits by the combination of analogue operational amplifiers. By the introduction of analogue operational amplifiers, this invention solves the aforementioned problems of the conventional digital technique once and for all and greatly increases its value for practical use by the simplification of circuits.

The fact that recently analogue operational amplifiers of high precision, high stability, microminiaturization and low cost can be readily obtained by the development of the integrated circuit technique makes the utilization of this invention more advantageous and its application is expected in electronic digital computers, various information processing apparatus, automatic control instruments, etc.

Further, it is needless to say that conventional digital circuits can be employed in part of the above circuits.

What we claim is:

1. A digital logic circuit comprising:

an adder-comparator stage receiving at least two digital inputs, each of which is weighted by a power of 2 and summed therein, said adder-comparator stage providing a "1" output when the result of said summation is equal to or larger than the threshold of said adder-comparator stage, where said threshold is set equal to the next higher power of 2; and an adder stage including an operational amplifier receiving the same at least two digital inputs and weighting them by the same power of 2 as used in said adder-comparator stage, said adder stage further receiving the output of said adder-comparator stage and weighting it by an amount equal to the threshold of said adder-comparator stage multiplied by minus 1, and further summing all of said weighted inputs, the output of said adder stage providing an output digit and the output of said adder-comparator stage providing a carry digit.

2. A digital adder circuit for summing two digital numbers each comprising one bit, which comprises:

an adder-comparator stage receiving a carry bit from a prior stage and the two bits of said digital numbers, said adder-comparator stage weighting said carry bit and said two bits by $2^0$ and summing said weighted bits to provide a "1" output when the results of said summation are equal to or larger than the threshold of said adder-comparator stage, where said threshold is set equal to $2^1$, and a "0" output when the results of said summation are smaller than said threshold; and an adder stage, including an operational amplifier, receiving said carry bit and said two bits, said adder stage weighting said carry bit and said two bits by $2^0$, said adder stage further receiving the output of said adder-comparator stage and weighting it by a factor of $-2^1$, the output of said adder stage providing an output digit and the output of said adder-comparator stage providing a carry digit.

3. A digital adder circuit for summing two digital numbers each comprising at least two bits, said adder circuit comprising:

a first adder-comparator stage receiving a carry bit from an adder circuit of lower significance and the four bits of said two digital numbers, said first adder-comparator stage weighting said carry bit and the least significant two bits of said four bits by a factor of $2^0$ and the remaining two bits by a factor of $2^1$ and, further, summing said five weighted bits to produce a "1" output if the results of said summation are greater than or equal to the threshold of said adder-comparator stage, and to produce a "0" output if the results of said summation are smaller than said threshold;

a first adder stage, including an operational amplifier, receiving said carry bit and said four bits and further receiving the output of said first adder-comparator stage; said first adder stage weighting said carry bit and the least significant two of said four bits by a factor of $2^0$ and said remaining two bits by a factor of $2^1$ and further weighting said output of the adder-comparator stage by a factor of $-2^2$, said first adder stage further summing all six of said weighted bits to produce an output;

a second adder-comparator stage receiving the output from said first adder stage and providing a "1" output if the output of said first adder stage is equal to or greater than $2^1$ and a "0" output if the output of said first adder stage is less than $2^1$; and a second adder stage, including an operational amplifier, receiving the output of said first adder stage and said second adder-comparator stage, said second adder stage weighting the output of said first adder stage by a factor of $2^0$ and the output of said second adder-comparator stage by $-2^1$, said second adder stage further summing said weighted inputs, the output of said first adder-comparator stage providing a carry digit, the output of said second adder-comparator stage provides the most significant output bit and the output of said second adder stage provides the least significant output bit of the summation of said two numbers.

4. A digital adder circuit for summing two digital numbers each comprising $(n+1)$ bits, which comprises:

an initial logic circuit including an adder-comparator stage having $(n+1)$ pairs of inputs to receive the least two significant bits through the most significant two bits, respectively, said adder-comparator circuit weighting said pairs of bits by factors of $2^0$ through $2^n$, respectively, and summing all of said weighted bits to provide a "1" output if the results of said summation exceed or equal the threshold of said adder-comparator stage, where said threshold is set equal to $2^{n+1}$, and to provide a "0" output if the results of said summation are less than said threshold, and an adder stage, including an operational amplifier, receiving the same inputs received by said adder-comparator stage and weighting said inputs by the same powers of 2 as did said adder-comparator stage, said adder stage further receiving the output of said adder-comparator stage and weighting it by a factor of $-2^{n+1}$, said adder stage further summing all of said weighted inputs to provide an output;

$n$ serially connected logic circuits, each logic circuit including an adder stage, including an operational amplifier, and an adder-comparator stage, the input to said adder-comparator stage and one input to said adder stage having a weighting factor of $2^0$ associated therewith, the adder-comparator stage of the first one of said $n$ logic circuits receiving the output from the adder stage of said initial logic circuit and providing a "1" output when the output from said initial adder stage is equal to or larger than the threshold of said first adder-comparator stage, where said threshold is set equal to $2^n$ and providing a "0" output if the output from said initial adder stage is less than said threshold, the adder stage of first one of said $n$ logic circuits receiving the output of said initial adder stage and the output of said first adder-comparator stage and weighting them by factors of $2^0$ and $-2^n$, respectively, the adder-comparator stage of the $i^{th}$ one of said $n$ logic circuits receiving the output of the adder stage of the $i+1^{th}$ one of said $n$ logic circuits and providing a "1" output when the output of said $i+1^{th}$ adder stage equal to or larger than the threshold of the $i^{th}$ adder-comparator stage, where said threshold is set equal to $2^{n+1\ 1\ i}$ and a "0" output when said output is smaller than the threshold value, the adder stage of said $i^{th}$ one of said $n$ logic circuits receiving the output of said $i+1^{th}$ adder stage and the output of said $i^{th}$ adder-comparator stage and weighting them by a factor of $2^0$ and $-2^{n+1\ 1\ i}$, respectively, the output of said initial adder-comparator-stage providing a carry bit, the output of the first adder-comparator stage providing the $n+1^{th}$ output bit, the output of the $i^{th}$ adder-comparator stage providing the $i+1^{th}$ output bit, the output of the adder-comparator stage of the $n^{th}$ one of said $n$ logic circuits providing the second least significant output bit and the adder stage of said $n^{th}$ logic circuit providing the least significant output bit.

5. A parallel adder circuit with high-speed carry, for summing two digital numbers each comprising $n+1$ bits, which comprises:

$n+1$ parallel-connected adder-comparator stages, the first one of said $n+1$ adder-comparator stages receiving the two least significant digits of said $n+1$ bits and weighting them by a factor of $2^0$, said first adder-comparator stage further summing said weighted inputs to produce a "1" output if the results of said summation are equal to or greater than the threshold of said first adder-comparator stage, where said threshold is set equal to $2^1$, and to produce a "0" output if said summation is less than said threshold, the second one of said $n+1$ adder-comparator stages receiving said two least significant bits and the two next more significant bits and weighting the pairs of input bits by $2^0$ and $2^1$, respectively, said second adder-comparator stage summing all said weighted inputs to produce a "1" output when the results of said summation is equal to or greater than the threshold of said adder-comparator stage, where said threshold is set equal to $2^2$, and a "0" output when the result of said summation is less than said threshold, the $i^{th}$ one of said $n+1$ adder-comparator stages receiving said two least significant bits through said $i^{th}$ most significant two bits and weighting the pairs of input bits by factors of $2^0$ through $2^i$, respectively, said $i^{th}$ adder-comparator stage summing all of said weighted inputs to produce a "1" output if the results of said summation exceed the threshold of said $i^{th}$ adder-comparator stage, where said threshold is set equal to $2^{i+1}$, and to produce a "0" output if the results of said summation are less than said threshold, the $n+1^{th}$ one of said adder-comparator stages receiving the least significant two bits through the most significant two bits and weighting the pairs of input bits by factors of $2^0$ through $2^n$, respectively, said $n+1^{th}$ adder-comparator stage summing all of said weighted inputs to produce a "1" output if the results of said summation exceed the threshold of said $n+1^{th}$ adder-comparator stage, where said threshold is set equal to $2^{n+1}$, and to produce a "0" output if the results of said summation are less than said threshold; and $n+1$ parallel-connected adder stages, the first one of said $n+1$ adder stages receiving the least two significant bits and weighting them by a factor of $2^0$ and further receiving the output of said first adder-comparator stage and weighting it by a factor of $-2^1$, said first adder stage summing all of said weighted inputs, the second one of said $n+1$ adder stages receiving a carry input from said first adder-comparator stage and the two next bits of higher significance and weighting them by factors of $2^0$, and further receiving the output of said second adder-comparator stage and weighting it by a factor of $-2^1$, said second adder stage summing all of said weighted inputs, the $i$th one of said $n+1$ adder stages receiving a carry input from the $i-1^{th}$ adder-comparator stage and the $i+1^{th}$ most significant two bits and weighting them by a factor of $2^0$ and further receiving the output of said $i^{th}$ adder-comparator stage and weighting it by a factor of $-2^1$, said $i^{th}$ adder stage summing all of said weighted inputs, the $n+1^{th}$ one of said adder stages receiving the carry input from said $n^{th}$ adder-comparator stage and the $n+1^{th}$ two most significant bits and weighting them by a factor of $2^0$, and further receiving the output of said $n+1^{th}$ adder-comparator stage and weighting it by a factor of $-2^1$, said $n+1^{th}$ adder stage summing all of said weighted inputs; and the output of said first adder stage providing the least significant output digit, the output of the $i^{th}$ adder stage providing the $i^{th}$ most significant output digit, the output of the $n+1^{th}$ adder stage providing the $n+1^{th}$ most significant output digit and the output of said $n+1^{th}$ adder-comparator stage provides a carry output.

6. A high speed parallel digital adder circuit for adding two digital numbers each comprising $n+1$ bits, which comprises:

$n+1$ logic circuits, each logic circuit including an adder-comparator stage and an adder stage, including an operational amplifier, the first one of said $n+1$ adder-comparator stages receiving the two bits of least significance and weighting them by a factor of $2^0$, said first adder-comparator stage further summing said weighted inputs to produce a "1" output if the results of said summation equals or exceeds a threshold set equal to $2^1$ and to produce a "0" output if the results of said summation are smaller than said threshold, the first one of said $n+1$ adder stages receiving the same two bits of least significance and weighting them by a factor of $2^0$ and further receiving the output of said first adder-comparator stage and weighting it by a factor of $-2^1$ and then summing all of said weighted inputs, the $i^{the}$ one of said $n+1$ adder comparator stages receiving the $i^{th}$ two bits of next significance and further receiving the output of the $i-1^{th}$ adder-comparator stage, all of said inputs being weighted by a factor of $2^0$, said $i^{th}$ adder-comparator stage summing all of said weighted inputs to provide a "1" output if the results of said summation exceed a threshold set equal to $2^1$ and to produce a "0" output if the results of said summation are smaller than said threshold, the $i^{th}$ one of said adder stages receiving the same two $i^{th}$ bits of next significance and the output of the $i-1^{th}$ adder-comparator stage and weighting them by a factor of $2^0$ and further receiving the output of the $i^{th}$ adder-comparator stage and weighting it by a factor of $-2^1$, and then summing all of said weighted outputs, the $n+1^{th}$ one of said adder-comparator stages receiving the two most significant bits and the output of the $n^{th}$ adder-comparator stage all of said inputs being weighted by a factor of $2^0$, said $n+1^{th}$ adder-comparator stage summing all of said weighted inputs to produce a "1" output if the results of said summation are equal to or greater than a threshold set equal to $2^1$ and to produce a "0" output if said results are smaller than said threshold, the $n+1^{th}$ one of said adder stages receiving the same two most significant bits and weighting them by a factor of $2^0$ and further receiving the output of the $n+1^{th}$ adder-comparator stage and weighting it by a factor of $-2^1$, and then summing all of said weighted inputs, the output of the first through the $n+1^{th}$ adder stages providing the least significant output to the $n+1^{th}$ significant output, respectively, and the output of the $n+1^{th}$ adder-comparator stage provides carry output.

7. A high-speed, parallel digital adder circuit for adding two digital numbers, each comprising $(n+1)$ bits, which comprises:

$(n+1)$ logic circuits, each logic circuit including an adder-comparator stage, and an adder stage including an operational amplifier, said $(n+1)$ logic circuits being grouped sequentially for every successive $j$ circuits, the first adder-comparator stage of the first group of $j$ circuits receiving the two bits of least significance and weighting them by a factor of $2^0$, and, further, summing said weighted inputs to produce a "1" output if the results of said summation equals or exceeds a threshold set equal to $2^1$ and to produce a "0" output if the results of said summation are smaller than said threshold, the first adder stage of said first group of $j$ circuits receiving the same two bits of least significance and weighting them by a factor of $2^0$ and further receiving the output of said first-adder comparator stage of the first group of $j$ circuits and weighting it by a factor of $-2^1$ and then summing all of said weighted inputs;

the second adder-comparator stage of the first group of $j$ circuits receiving the two bits of least significance and the two bits of the next higher significance and weighting them by factors of $2^0$ and $2^1$, respectively, and further summing said weighted inputs to produce a "1" output if the results of said summation equals or exceeds a threshold set equal to $2^2$ and to produce a "0" output if the results of said summation are smaller than said threshold, the second adder stage of the first group of $j$ circuits receiving the two bits of the next higher significance and the output of said first adder-comparator stage of the first group of $j$ circuits and weighting them by a factor of $2^0$ and further receiving the output of said second adder-comparator stage of the first group of $j$ circuits and weighting it by a factor of $-2^1$ and then summing all said weighted inputs;

the $j^{th}$ adder-comparator stage of said first group of $j$ circuits receiving the least two significant bits through the $j^{th}$ pair of bits and weighting them by factors of $2^0$ through $2^{j11}$, respectively, said $j^{th}$ adder-comparator stage of said first group of $j$ circuits further summing all said weighted inputs to produce a "1" output if the results of said summation equals or exceeds a threshold set equal to $2^j$ and to produce a "0" output if the results of said summation are smaller than said threshold, the $j^{th}$ adder stage of said first group of $j$ circuits receiving the $j^{th}$ pair of bits and the output of the $(j-1)^{th}$ adder-comparator stage of said first group of $j$ circuits and weighting it by a factor of $-2'$ and then summing all of said weighted inputs;

the 1st, 2nd ... $j^{th}$ adder-comparator stages of the successive $(K-1)$ groups of $j$ circuits similarly operating on the $(j+1)^{th}$, $,2j+1)^{th}$...$((K-1.j+1.^{th}$; $(j+1,\ 2)^{th}$, $,2j+1,\ 2)^{th}$... $((K-1)j+1,\ 2)^{th}$ and the $,j+1.\ 2.\ 2)^{th}$, $(2j+1.\ 2,\ 3)^{th}$... $((K-1)j+1,\ 2.\ 3)^{th}$ pairs of bits, respectively, and the 1st, 2nd, ... $j^{th}$ adder stages of the successive $(K-1)$ groups of $j$ circuits similarly operating on the $(j+1)^{th}$, $(2j+1)^{th}$ ... $((K-1)j+1)^{th}$; $(j+2)^{th}$, $(2j+2)^{th}$...$((K-1)j+2)^{th}$; and the $(j+3)$, $(2j+3)^{th}$ ... $((K-1)j+3)^{th}$ pairs of bits, respectively;

each adder-comparator stage in the second group of $j$ circuits receiving as an input the output of the $j^{th}$ adder-comparator stage in said first group of $j$ circuits and weighting it by a factor of $2^0$;

each adder-comparator stage in the $K^{th}$ group of $j$ circuits receiving as an output of the $j^{th}$ adder-comparator stage of the preceding $(K-1)^{th}$ group of $j$ circuits and weighting it by a factor of $2^0$; the largest number of inputs to the adder-comparator stages in each group being less than $2^{j+1}$, the outputs of the first adder stage in said first group of $j$ circuits through the $j^{th}$ adder stage in said $K^{th}$ group of $j$ circuits providing the least significant output through the most significant output, respectively, and the output of the $j^{th}$ adder-comparator stage of said $K^{th}$ group of $j$ circuits providing a carry-output, whereby, said two digital numbers, each having a large number of digits, are added.